US012366824B2

(12) United States Patent
Ravizza

(10) Patent No.: US 12,366,824 B2
(45) Date of Patent: *Jul. 22, 2025

(54) DIFFERENTIAL HOLOGRAPHY

(71) Applicant: Lawrence Livermore National Security, LLC, Livermore, CA (US)

(72) Inventor: Frank Ravizza, Brentwood, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/535,277

(22) Filed: Nov. 24, 2021

(65) Prior Publication Data

US 2022/0113674 A1 Apr. 14, 2022

Related U.S. Application Data

(63) Continuation of application No. 16/377,493, filed on Apr. 8, 2019, now Pat. No. 11,215,951.

(51) Int. Cl.
*G03H 1/16* (2006.01)
*G03H 1/04* (2006.01)
*G03H 1/08* (2006.01)

(52) U.S. Cl.
CPC ............. *G03H 1/16* (2013.01); *G03H 1/0443* (2013.01); *G03H 1/0808* (2013.01);
(Continued)

(58) Field of Classification Search
CPC ...... G03H 1/16; G03H 1/0443; G03H 1/0808; G03H 2001/045; G03H 2223/23;
(Continued)

(56) References Cited

U.S. PATENT DOCUMENTS

| 11,215,951 | B2 * | 1/2022 | Ravizza | G03H 1/16 |
| 2014/0193850 | A1 * | 7/2014 | Jooris | G03H 1/0866 |
| | | | | 435/29 |
| 2017/0003650 | A1 | 1/2017 | Moser et al. | |

OTHER PUBLICATIONS

Qiao et al. (Development of an optical differentiation wavefront sensor based on binary pixelated transmission filters, Proc. SPIE 909, Adaptive Optics Systems V, 99096R, Jul. 2016). (Year: 2016).*

(Continued)

*Primary Examiner* — Jyotsna V Dabbi
(74) *Attorney, Agent, or Firm* — Ladas & Parry, LLP

(57) ABSTRACT

Differential Holography technology measures the amplitude and/or phase of, e.g., an incident linearly polarized spatially coherent quasi-monochromatic optical field by optically computing the first derivative of the field and linearly mapping it to an irradiance signal detectable by an image sensor. This information recorded on the image sensor is then recovered by a simple algorithm. In some embodiments, an input field is split into two or more beams to independently compute the horizontal and vertical derivatives (using amplitude gradient filters in orthogonal orientations) for detection on one image sensor in separate regions of interest (ROIs) or on multiple image sensors. A third unfiltered beam recorded in a third ROI directly measures amplitude variations in the input field to numerically remove its contribution as noise before recovering the original wavefront using a numerical in algorithm. When combined, the measured amplitude and phase constitute a holographic recording of the incident optical field.

31 Claims, 3 Drawing Sheets

(52) U.S. Cl.
CPC .............. *G03H 2001/045* (2013.01); *G03H 2223/23* (2013.01); *G03H 2223/55* (2013.01)

(58) Field of Classification Search
CPC ........ G03H 2223/55; G03H 2001/0875; G01J 2009/0238; G01J 2009/0261; G01J 9/02
See application file for complete search history.

(56) References Cited

OTHER PUBLICATIONS

Zou (Optimization of Zonal Wavefront Estimation and Curvature Measurements. Doctoral Dissertation, University of Central Florida, 2007. Electronic Theses and Dissertations. 3432. Available at: https://stars.library.ucf.edu/etd/3432). (Year: 2007).*

Chanteloup et al.(Multiple-wave lateral shearing interferometry for wave-front sensing, Applied Optics, vol. 44, No. 9, Mar. 20, 2005, pp. 1559-1571). (Year: 2005).*
Primot et al.(Wavefront sensor prototype for industrial applications based on a three-level phase grating, Opt Eng. 36(3) 901-904, Mar. 1997) (Year: 1997).*
Bortz, "Wave-front sensing by optical phase differentiation," J. Opt. Soc. Am. A, vol. 1, No. 1, 1984, entire document.
Qiao et al., "Optical Differentiation Wavefront Sensing for Astronomy and Vision Applications," Imaging and Applied Optics Congress, 2016, entire document.
Sprague et al., "Quantitative Visualization of Large Variation Phase Objects," Applied Optics, vol. 11, No. 7, 1972, entire document.
Di Martino et al., Phase retrieval from one partial derivative, Optics Letters vol. 38, No. 22, Nov. 2013, Year: 2013, entire document.
Legarda-Saenz, Robust wavefront estimation using multiple directional derivatives in moire deflectometry, Optics and Lasers in Engineering 45, 2007, Year: 2007, entire document.

* cited by examiner

DIFFERENTIAL HOLOGRAPHY

CROSS-REFERENCE TO RELATED APPLICATION

This application is a continuation of U.S. patent application Ser. No. 16/377,493 filed on Apr. 8, 2019, the disclosure of which is incorporated herein by reference in its entirety.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND OF THE INVENTION

Field of the Invention

This invention relates to holography, or the complete recording of both the phase and amplitude of waves, as can be done with light. Specifically, it relates to linearly mapping the phase of an incident optical field to an irradiance signal detectable by an image sensor, where the irradiance signal is readily convertible to phase using an optical filter. When combined with measured wave amplitude taken directly from the unfiltered irradiance signal, this phase constitutes a holographic recording.

Description of Related Art

Since the phase of light waves cannot be directly detected by photo sensors, whereas amplitude via irradiance can, phase measurement is a well-known challenge in the field of optics. Instead, phase variations must first be converted to an irradiance signal prior to detection and then phase is recovered from this signal using an appropriate algorithm. Such techniques typically require a complex set of hardware and processing that limit them to a few specific applications. Therefore, most light measurement techniques today, i.e., imaging, are limited to recording just the amplitude component of the hologram. Stated simply, wavefront phase measurement is the challenging task in holographic recording.

Wavefront phase measurement techniques are generally characterized by their phase accuracy, speed (e.g., frame rate), spatial resolution, operational wavelength, and cost/complexity. Wavefront sensors (WFS) are one example of a phase measuring instruments that convert wavefront phase into irradiance. Such devices are commonly employed to correct wavefront errors using an adaptive optics (AO) systems, e.g. astronomical telescopes and laser systems. These applications and many others have an ever-growing need for accurate wavefront measurement at higher resolution and frame rates.

The Shack-Hartmann wavefront sensor (SH-WFS) is the standard wavefront phase measurement device used by AO systems to provide closed-loop wavefront correction using one or more deformable mirrors (DM). This instrument employs an array of small lenses (termed lenslets) across the field to decompose a wavefront into a discrete set of spatial samples by measuring the phase as independent localized wavefront slopes by measuring focal spot position changes produced by each lenslet. In practice, accurate focal spot position measurement requires a substantially larger spatial sample of image sensor pixels compared to the number of lenslets, e.g. a 10×10-pixel region of interest (ROI). Spot positions are numerically calculated using some form of computationally intensive spot-finding algorithm, e.g., peak finding, enter-of-gravity, paraboloid linear regression, etc.

For high temporal bandwidth applications SH-WFS, frames rates are fundamentally limited by image sensor data bandwidth, i.e. the product of the number of pixels, bit depth, and frame rate cannot exceed the data rate of the digital electronics. In demanding applications, the user may need to use a smaller number of lenslets than preferred for the application because of these data rate limitations. This limitation exists by the requirement to calculate focal spot position from a large number of pixels within each ROI. Thus, a significant disadvantage of the SH-WFS is that only a small fraction of the pixels contributes a spatial sample of the local wavefront. For example, for a system using a 1000×1000 pixel image sensor array with 10×10 pixel region of interest (ROI) for each lenslet focal spot, only 1% of the pixels in the sensor contribute a wavefront phase measurement.

Interferometers are another type of wavefront phase measurement device. As implied in its name, these devices convert a phase signal into a pattern produced by the interference of two waves, called a fringe pattern. Generally, one wavefront is a near as perfect spherical wave (or near planar wave), called the reference, and the second is the wavefront to be measured. Many techniques exist to recover the phase of the measured wavefront from the resultant fringe pattern. Many interferometry techniques require relative phase shifting between the two wavefronts to accurately reconstruct the wavefront from the interference pattern. Due their dependence on this nearfield interference effect, interferometers are limited to recording coherent light, or light which can readily generate interference fringes. Also, because of the requirement to phase shift and the numerical overhead in the phase recovery algorithm, they are only useful in low speed applications, e.g. specialized laboratory instruments.

SUMMARY OF THE INVENTION

Differential holography (DH), the invention disclosed here, applies to general optical fields unlike existing instruments, and operates at higher temporal bandwidth and spatial resolution because of its inherently low numerical overhead and every pixel in the image contributing a wavefront phase measurement. For example, taking the SH-WFS example with a 1000×1000 pixel array and 10×10 pixel ROI, the DH theoretically provides 50-100× the spatial/temporal resolution. Delivering superior wavefront resolution to AO systems could provide astronomers images with substantially greater detail.

Embodiments of the presented invention measure the wavefront of an incident linearly polarized spatially coherent quasi-monochromatic optical field by optically computing the first derivative of the wavefront and then linearly mapping it to an irradiance signal detectable by an image sensor. This irradiance signal recorded on the image sensor is then converted to wavefront phase by a simple algorithm. In Differential Holography, the derivative of the phase is measured directly as an irradiance signal. The first-derivative of the input field is calculated, optically by a Fourier transformation lens and linear amplitude transmission gradient filter.

A DH system measures the wavefront over a tunable finite optical path difference (OPD) bandwidth governed by the filter. The operational principle behind DH can be shown by an equation derived from wave optics first-principles (Maxwell's equations) demonstrating that any input wavefront can be recovered from a recorded differential irradiance signal. It also describes the procedure used to extract the wavefront phase from the differential irradiance signal and how to remove any field amplitude variations that can manifest as noise superimposed on the differential phase signal. As constructed, a DH system splits an input field into two or more beams to independently compute the horizontal and vertical derivatives (using amplitude gradient filters in orthogonal orientations) for detection on one image sensor in separate regions of interest (ROIs) or on multiple image sensors. A third unfiltered beam recorded by a third ROI can be added to directly measure these amplitude variations in the input field to numerically remove its contribution as noise before recovering the original wavefront using a numerical integration algorithm. In combination, the measured amplitude and recovered phase provide a holographic recording of the input field.

The above measurement principle made possible by this invention extends to general optical fields, meaning depolarized partially spatially coherent polychromatic light, by prefiltering this light field into discrete linearly polarized spatially coherent quasi-monochromatic optical beams for subsequent parallel processing by an efficient scalable array of optical computers.

Example uses of this invention include general holography, medical imaging, general purpose metrology, production metrology and inspection, phase microscopy of biological cells, and wavefront sensing for closed-loop adaptive optic system for astronomical telescopes.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

In its most basic form, DH linearly maps the wavefront derivative of an incoming optical field (quasi-monochromatic, spatially coherent light) into a proportional differential irradiance signal that when processed, can be directly converted to a measured phase. The differential field is produced optically using a Fourier transform lens and linear amplitude gradient filter located at the Fourier plane. Measuring the complete wavefront phase requires splitting the beam into two copies to independently compute the horizontal and vertical differentiated fields using orthogonally oriented amplitude gradient filters. Background amplitude terms that are superimposed within the proportional differential wavefront phase signal manifest as noise and can be removed from the differentiated field using a third nearfield irradiance measurement recorded as an unfiltered third copy of the split incoming beam. An three of these irradiance signals can be recorded on a single image sensor to provide intrinsic synchronization, or on several synchronized image sensors. The recorded wavefront phase and amplitude measurements constitute a holographic recording of the input field. The optical hardware and numerical procedure needed to produce a holographic recording using DH can be analytically derived from fundamental optical physics (Maxwell's equations).

This procedure can be extended to holographic recording of general optical field, such as polychromatic spatially incoherent light, by splitting the incoming optical field into additional copies which are then spatially and/or chromatically filtered into separate channels for processing using the same procedure described for quasi-monochromatic spatially coherent light.

Figure 1:
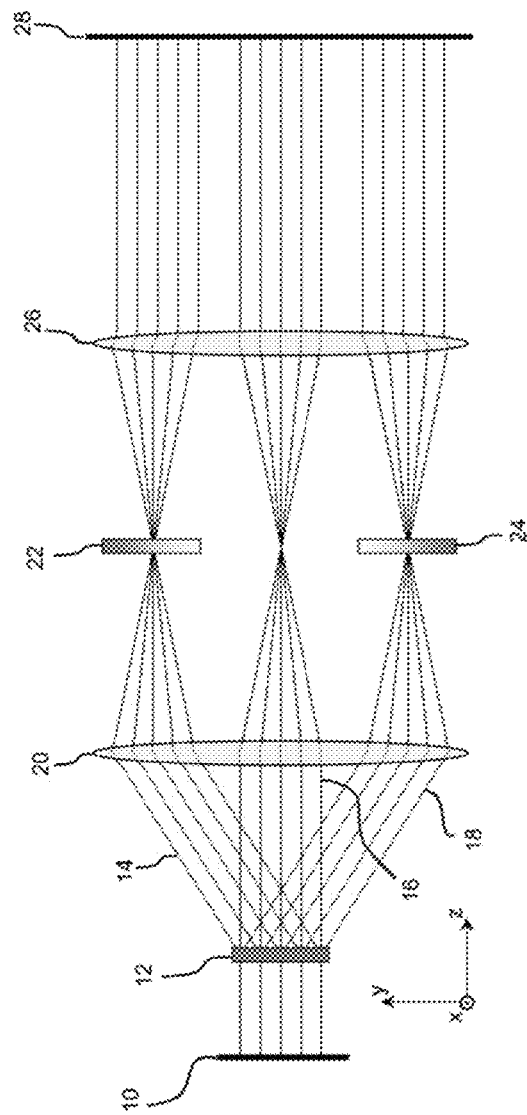
FIG. 1 shows an exemplary embodiment of the invention whereby a hologram is recorded of an input optical field of quasi-monochromatic spatially coherent light following processing of three recorded irradiance signals from two optically computed orthogonally differentiated optical fields and a third unfiltered field.

Additionally the DH operational principle is applicable to holographic recordings of electromagnetic waves across its frequency spectrum, from radio waves to gamma rays because the optical physics are the same and the optical components (Fourier transform lens and amplitude gradient filter) can be fabricated for non-visible light where traditional forms of wavefront measurement and holographic recording might be prohibitive by lack of hardware components. Furthermore, non-electromagnetic waves can also be holographically recorded, e.g. acoustic waves, or any other form of wave where optical analogies are applicable, FIG. 1 shows an exemplary embodiment of the invention. An input collimated quasi-monochromatic optical field, referred to herein as beam 10 is split into three beams by a 1:3 diffractive optic splitter 12 to produce beams 14, 16 and 18. These three beams are focused by lens 20 to optically compute the Fourier transform of the optical field at lens focus. Each beam passes through a separate focus and are recollimated by lens 26, Spatial filters (linear amplitude transmission or reflective gradient filters) 22 and 24 are placed at the respective focal positions (Fourier planes) where lens 20 focuses beam 14 and 18. No filter is located at the focal position of beam 16. Spatial filter 22 and 24 are oriented orthogonally to one another, e.g., in the x and y directions. As discussed above, beam 16 is unfiltered to provide a direct measurement of the amplitude variations in the input field to numerically remove such variations manifesting as noise in the differentiated field signal from which the wavefront is to be recovered using a numerical integration algorithm. The recollimated beams exiting lens 26 propagate onto image sensor 28. This is but one example embodiment. Based on this example, those skilled in the art will be able to make modifications and component substitutions, and such are within the scope of this invention. Embodiments of this invention split the input field into three beams, two of which are passed through orthogonally oriented filters to optically compute the derivative of the field in orthogonal directions. The three beams are propagated onto an image sensor. The third beam is used to remove noise.

Figure 2:
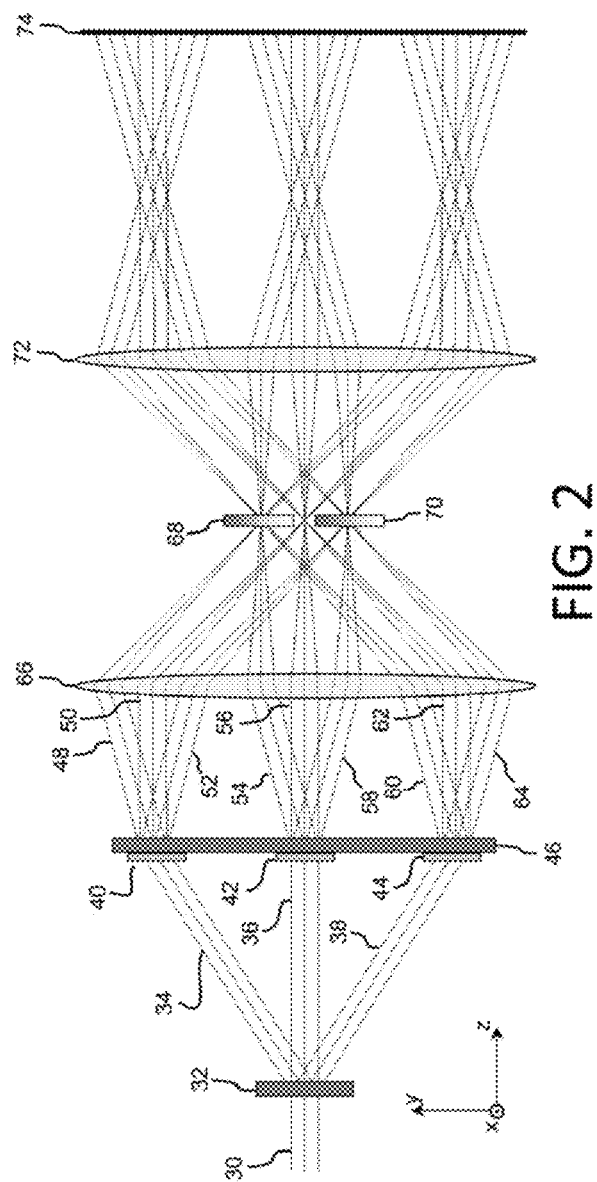
FIG. 2 shows an extended exemplary embodiment elaborating on FIG. 1 whereby an input optical field is split into more than 3 beams (nine beams shown) to extend wavefront recording of a general optical field (polychromatic and/or spatially incoherent light) to enable holographic recording using a combination of additional beam splitters and a series of chromatic and/or spatial filters prior to recovering a hologram of each additional chromatic or spatially filtered beams.

FIG. 2 shows an embodiment that splits an input beam into nine beams to enable holographic recording of polychromatic light. Input beam 30 propagates onto a first 1:3 diffractive optic splitter 32 which produces beams 34, 36 and 38 each of which then passes through a respective chromatic filter 40, 42 and 44 to separate the input beam into three separate quasi-monochromatic wavelengths band, e.g., red, green, and blue channels for visible light. A second 1:3 diffractive optic splitter 46 separates the 3 color channels into 3 additional beams each. After passage through their respective second splitter, beam 34 is split into beams 48, 50 and 52. Likewise beam 36 is split to produce beams 54, 56 and 58 and beam 38 is split to produce beams 60, 62 and 64. All of these beams propagating from the respective second splitter pass through Fourier lens 66 which focuses them through the focal position of lens 66. At the focal position, beams 48, 54 and 60 propagate through filter 68. Similarly, beams 52, 58 and 64 propagate through filter 70. Filters 68 and 70 are oriented orthogonally with respect to one another. Beams 50, 56 and 62 propagate through the focal position and are unfiltered. All of the beams are then collected by Fourier lens 72 and directed onto an image sensor 74. These signals are processed as discussed below.

Figure 3:
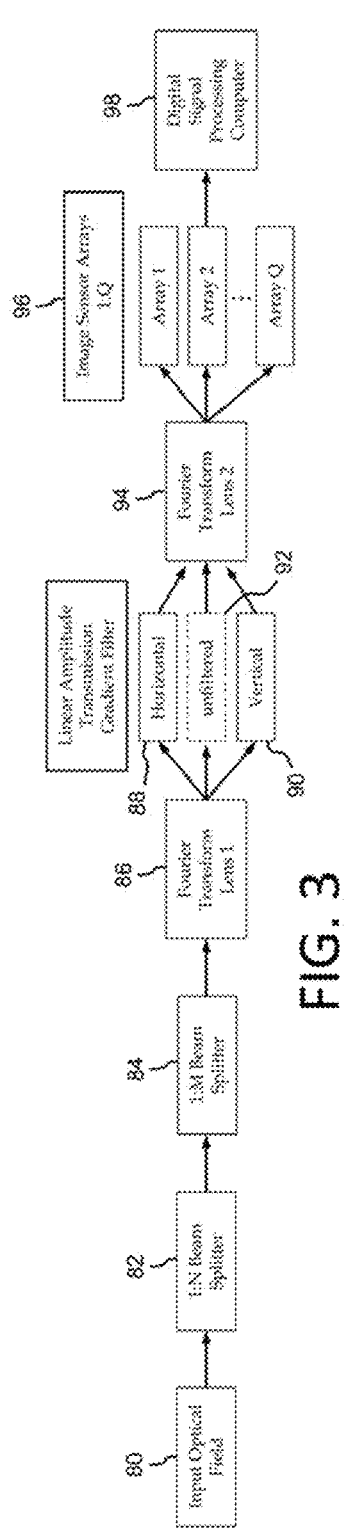
FIG. 3 shows a general block diagram that is applicable to the embodiments of FIG. 1 and FIG. 2 as well as embodiments utilizing other splitter numbers, filters and configurations.

FIG. 3 shows a general block diagram that is applicable to the embodiment of FIG. 1 and FIG. 2 as well as embodiments utilizing other splitter numbers, combinations and configurations. An input optical field 80 provides a beam which propagates through a 1:N diffractive optical splitter 82 followed by a 1:M diffractive optic splitter 84. The M beams are directed though a Fourier Transform lens 86 and its output beams propagate to a horizontal (88) or vertical (90) linear amplitude transmission gradient filter or are unfiltered 92. The outputs of the filtered and unfiltered beams pass through a Fourier transform lens 94 and then onto a 1:Q array 96 of image sensors. The signals produced by the image sensors are processed, generally for convenience in a computer 98 having a computer readable medium running software according to an algorithm described below.

Figure 4:
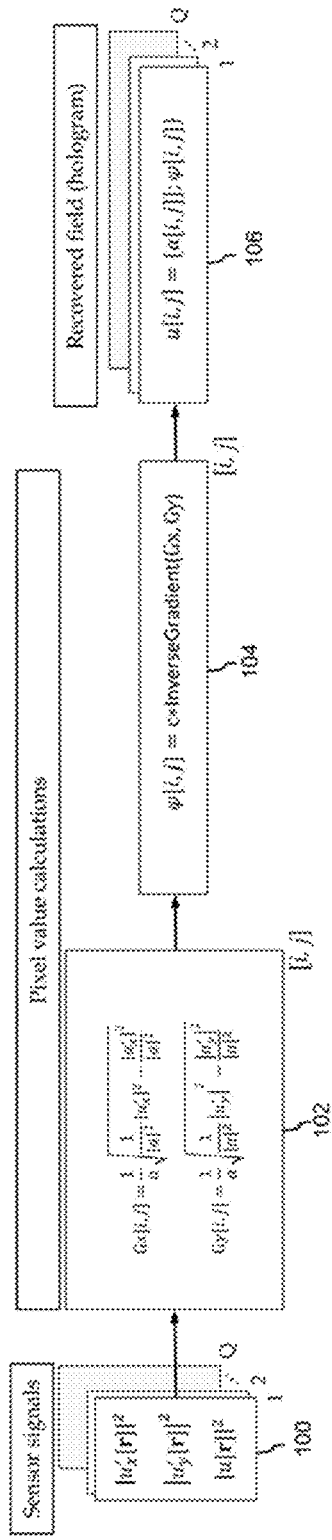
FIG. 4 is a flow chart description of the algorithm useable to process the signal collected by the image sensors to produce a holographic recording.

FIG. 4 is a flow chart of the algorithm useable to process the signal collected by the image sensors. For each 1:Q recorded image sensor signals, three irradiance signals are generated 100: 1) the irradiance of the differentiated field in the x-dimension (horizontal direction) $|u'_x(r)|^2$ (FIG. 3 88) optically computed by beams FIG. 1 18; FIGS. 2 52, 58 and 64, 2) the irradiance of the differentiated field in the y-dimension (vertical direction) $|u'_y(r)|^2$ (FIG. 3 90) optically computed by beams FIG. 1 14; FIGS. 2 48, 54 and 60, and 3) the irradiance signal of the unfiltered field $|a(r)|^2$ (FIG. 3 92) as measured by the unfiltered beams FIG. 1 16; FIGS. 2 50, 56 and 62, where the symbol r notes a vector form of the transverse spatial variable dimensions expressed as r=[x, y] An additional two signals $|a'_x(r)|^2$ and $|a'_y(r)|^2$ are calculated as the numeric derivative from the sensor signal $|a(r)|^2$ in the horizontal and vertical directions respectively. Each of the five signal terms are recorded and stored as an array of numeric values in each picture element comprising the image sensor array herein referred to as an indexed pixel value i and j. Each numeric pixel value is numerically processed into two arrays G1 and G2 by equations 100:

$$Gx[i,j] = \frac{1}{\alpha}\sqrt{\frac{1}{|a|^2}|u'_x|^2 - \frac{|a'_x|^2}{|a|^2}};$$

$$Gy[i,j] = \frac{1}{\alpha}\sqrt{\frac{1}{|a|^2}|u'_y|^2 - \frac{|a'_y|^2}{|a|^2}},$$

where the x and y spatial dependence (vector r) of the variables has been dropped for concise presentation, but the amplitude and optical field variables a and u and their corresponding partial differentiated forms should be understood to have 2D spatial dependence. All variables in Eq. 2 are measured signal quantities discretely spatially sampled by image sensor pixels at array indexes i and j.

Using Gx and Gy the phase of the wavefront can now be recovered from a numeric inverse gradient algorithm InverseGradient(Gx, Gy, where the arguments Gx and Gy are the gradients of an array of values supplied to the function that returns the anti-gradient, or the original function as shown in 104:

$$\varphi[i,j]=c*\text{InverseGradient}(Gx,Gy)$$

where φ[i, j] is the wavefront phase recovered after multiplying each pixel by a known proportionality constant c governed by the linear amplitude gradient filter slope. For configurations where multiple field derivatives are measured, like that shown in FIG. 2 for polychromatic light, the phase of each channel indexed by Q are calculated using the same algorithm expressed by Eq. 104.

Finally a holographic recording of the input field is constructed from the recovered phase φ[i, j] and the directly measured amplitude a[i, j] 106:

$$u[i,j]=[a[i,j];\varphi[i,j]],$$

where $a[i,j]=\sqrt{|u[i,j]|^2}$, and where the magnitude of the optical field amplitude converts from the unfiltered field irradiance signal as a square-root operation on each pixel numeric value. This is an inverse operation using known optical physics where field irradiance is calculated as the magnitude-squared of the field.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in, the art to best use the invention in various embodiments and with various modifications suited to the particular use contemplated. The scope of the invention is to be defined by the following claims.

I claim:

1. A method, comprising: providing an input electromagnetic radiation field;
splitting said input field into a first beam and a second beam;
(i) optically computing a derivative of said first beam and (ii) optically computing a derivative of said second beam;
detecting said derivative of said first beam as first irradiance to produce a first detected signal; and
detecting said derivative of said second beam as second irradiance to produce a second detected signal; and
determining a recovered wavefront phase of said input electromagnetic radiation field from said first detected signal and said second detected signal; wherein the step of splitting said input field further comprises splitting said input field into a third beam; wherein the method further comprises:
  detecting said third beam as third irradiance to produce a third detected signal;
  determining a recovered electric field amplitude from said third detected signal; utilizing said recovered amplitude to determine amplitude variations in said input field; and
  removing unwanted portions of said amplitude variations from said first and second detected signals.

2. The method of claim 1, wherein the step of optically computing a derivative of said first beam comprises propagating said first beam through a first lens and then through a first filter, wherein said first filter is located at a focal plane of said first beam as produced by said first lens, wherein the step of optically computing a derivative of said second beam comprises propagating said second beam through said first lens and then through a second filter, wherein said second filter is located at the focal plane of said second beam as produced by said first lens.

3. The method of claim 1, wherein said first filter comprises a first linear amplitude transmission gradient filter or a first linear amplitude reflective gradient filter and wherein said second filter comprises a second linear amplitude transmission gradient filter or a second linear amplitude reflective gradient filter.

4. The method of claim 1, wherein said input electromagnetic radiation field is quasi-monochromatic and spatially coherent light.

5. The method of claim 4, wherein said input electromagnetic radiation field is linearly polarized.

6. The method of claim 4, wherein said quasi-monochromatic and spatially coherent light is produced from polychromatic spatially incoherent light.

7. The method of claim 1, wherein the step of splitting is carried out with a diffractive optic splitter.

8. The method of claim 1, wherein the step of detecting said derivative of said first beam and the step of detecting said derivative of said second beam occur simultaneously.

9. The method of claim 1, wherein the derivatives of said first and second beams are partial derivatives.

10. The method of claim 9, wherein the step of optically computing the partial derivative of said first beam utilizes a first filter and the step of optically computing the partial derivative of said second beam utilizes a second filter, the second filter being orthogonal to said first filter.

11. A method, comprising:
  splitting, using a first 1:3 diffractive optic splitter, an input beam into a first beam, a second beam and a third beam;
  (i) passing said first beam through a first chromatic filter to produce a first quasi-monochromatic wavelength band; (ii) passing said second beam through a second chromatic filter to produce a second quasi-monochromatic wavelength band; and (iii) passing said third beam through a third chromatic filter to produce a third quasi monochromatic wavelength band;
  splitting, using a second 1:3 diffractive optic splitter, (i) said first quasi-monochromatic wavelength band into three sub-beams referred to herein as beam 1, beam 2, and beam 3, (ii) said second quasi-monochromatic wavelength band into three sub-beams referred to herein as beam 4, beam 5 and beam 6 and (iii) said third quasi-monochromatic wavelength band into three sub-beams referred to herein as beam 7, beam 8 and beam 9;
  passing each of said beams 1 to 9 through a first lens which focuses each of said beams 1 to 9 through a focal position of said first lens;
  at the focal position of said first lens, (i) passing said beam 1, said beam 4 and said beam 7 through a first filter, (ii) passing said beam 3, said beam 6 and said beam 9 through a second filter, wherein said first filter is oriented orthogonally with respect to said second filter, and (iii) passing, without filtering, said beam 2, beam 5 and beam 8 through said focal position; and
  collecting each of said beams 1 to 9 by a second Fourier lens which directs each of said beams 1 to 9 onto an imager sensor.

12. The method of claim 11, wherein said first filter comprises a first linear amplitude transmission gradient filter or a first linear amplitude reflective gradient filter and wherein said second filter comprises a second linear amplitude transmission gradient filter or a second linear amplitude reflective gradient filter.

13. A method, comprising: providing an input electromagnetic radiation field;
  splitting said input field into at least a first beam and a second beam; optically computing a derivative of said first beam;
  optically computing a derivative of said second beam;
  detecting said derivative of said first beam as first irradiance to produce a first detected signal; and
  detecting said derivative of said second beam as second irradiance to produce a second detected signal; and
  determining a recovered wavefront phase of said input electromagnetic radiation field from said first detected signal and said second detected signal;
  wherein the step of splitting said input field further comprises splitting said input field into a third beam;
  wherein the method further comprises:
  detecting said third beam as third irradiance to produce a third detected signal;
  determining a recovered electric field amplitude from said third detected signal; utilizing said recovered amplitude to determine amplitude variations in said input field; and
  removing unwanted portions of said amplitude variations from said first and second detected signals.

14. The method of claim 13, wherein the step of optically computing a derivative of said first beam comprises propagating said first beam through a first lens and then through a first filter, wherein said first filter is located at a focal plane of said first beam as produced by said first lens, wherein the step of optically computing a derivative of said second beam comprises propagating said second beam through said first lens and then through a second filter, wherein said second filter is located at a focal plane of said second beam as produced by said first lens.

15. The method of claim 13, wherein said first filter comprises a first linear amplitude transmission gradient filter or a first linear amplitude reflective gradient filter and wherein said second filter comprises a second linear amplitude transmission gradient filter or a second linear amplitude reflective gradient filter.

16. The method of claim 13, wherein said input electromagnetic radiation field is quasi-monochromatic and spatially coherent light.

17. The method of claim 16, wherein said input electromagnetic radiation field is linearly polarized.

18. The method of claim 16, wherein said quasi-monochromatic and spatially coherent light is produced from polychromatic spatially incoherent light.

19. The method of claim 13, wherein the step of splitting is carried out with a diffractive optic splitter.

20. The method of claim 13, wherein the step of detecting said partial derivative of said first beam and the step of detecting said partial derivative of said second beam occur simultaneously.

21. The method of claim 13, wherein the derivatives of said first and second beams are partial derivatives.

22. The method of claim 21, wherein the step of optically computing the partial derivative of said first beam utilizes a first filter and the step of optically computing the partial derivative of said second beam utilizes a second filter, the second filter being orthogonal to said first filter.

23. An apparatus, comprising:
an optic splitter, the optic splitter, in use, splitting an input electromagnetic radiation field into a first beam and a second beam;
a first lens, a first filter and a second filter, wherein said first lens and said first filter optically compute a derivative of said first beam and wherein said first lens and said second filter optically compute a derivative of said second beam, wherein said second filter is orthogonal to said first filter; and
at least one detector configured to (i) detect said derivative of said first beam as first irradiance to produce a first detected signal and (ii) detect said derivative of said second beam as second irradiance to produce a second detected signal;
the apparatus further comprising means for (i) determining a recovered amplitude from said third detected signal, (ii) utilizing said recovered amplitude to determine amplitude variations in said input field and (iii) removing unwanted portions of said amplitude variations from said first and second detected signals.

24. The apparatus of claim 23, further comprising means for determining a recovered wavefront of said input electromagnetic radiation field from said first detected signal and said second detected signal.

25. The apparatus of claim 23, wherein said optic splitter also splits said input electromagnetic radiation field into a third beam and wherein said at least one detector is configured to detect said third beam as third irradiance to produce a third detected signal.

26. The apparatus of claim 23, wherein said first filter is located at a focal plane of said first beam as produced by said first lens and wherein said second filter is located at a focal plane of said second beam as produced by a second lens.

27. The apparatus of claim 23, wherein said first filter comprises a first linear amplitude transmission gradient filter or a first linear amplitude reflective gradient filter and wherein said second filter comprises a second linear amplitude transmission gradient filter or a second linear amplitude reflective gradient filter.

28. An apparatus, comprising:
a first 1:3 diffractive optic splitter configured for splitting a polychromatic input beam into a first beam, a second beam and a third beam;
a first chromatic filter positioned in the path of said first beam to produce a first quasimonochromatic wavelength band;
a second chromatic filter positioned in the path of said second beam to produce a second quasi-monochromatic wavelength band;
a third chromatic filter positioned in the path of said third beam to produce a third quasimonochromatic wavelength band;
a second 1:3 diffractive optic splitter configured for splitting:
(i) said first quasi-monochromatic wavelength band into three sub-beams, referred to herein as beam 1, beam 2, and beam 3,
(ii) said second quasi-monochromatic wavelength band into three sub-beams, referred to herein as beam 4, beam 5 and beam 6, and
(iii) said third quasi-monochromatic wavelength band into three sub-beams referred to herein as beam 7, beam 8 and beam 9;
a lens positioned in the path of each of said beams 1 to 9 such that said lens focuses each of said beams 1 to 9;
a first filter and a second filter positioned at the focal position of said lens such that (i) said beam 1, said beam 4 and said beam 7 pass through said first filter, (ii) said beam 3, said beam 6 and said beam 9 pass through said second filter and (iii) wherein said beam 2, beam 5 and beam 8 pass through said focal position without filtering; and
an image sensor positioned to sense each of said beams 1 to 9.

29. The apparatus of claim 28, wherein said first filter comprises a first linear amplitude transmission gradient filter or a first linear amplitude reflective gradient filter and wherein said second filter comprises a second linear amplitude transmission gradient filter or a second linear amplitude reflective gradient filter and wherein said first filter is oriented orthogonally with respect to said second filter.

30. The apparatus of claim 28, further comprising means for determining a recovered wavefront of said input electromagnetic radiation field from said sensed beams.

31. The apparatus of claim 28, wherein the image sensor is positioned to sense each of said beams 1 to 9 to produce sensor signals, the apparatus further comprising means for determining amplitude variations in said input field and removing unwanted portions of said amplitude variations from at least one of said sensor signals.

* * * * *